Patented Oct. 19, 1926.

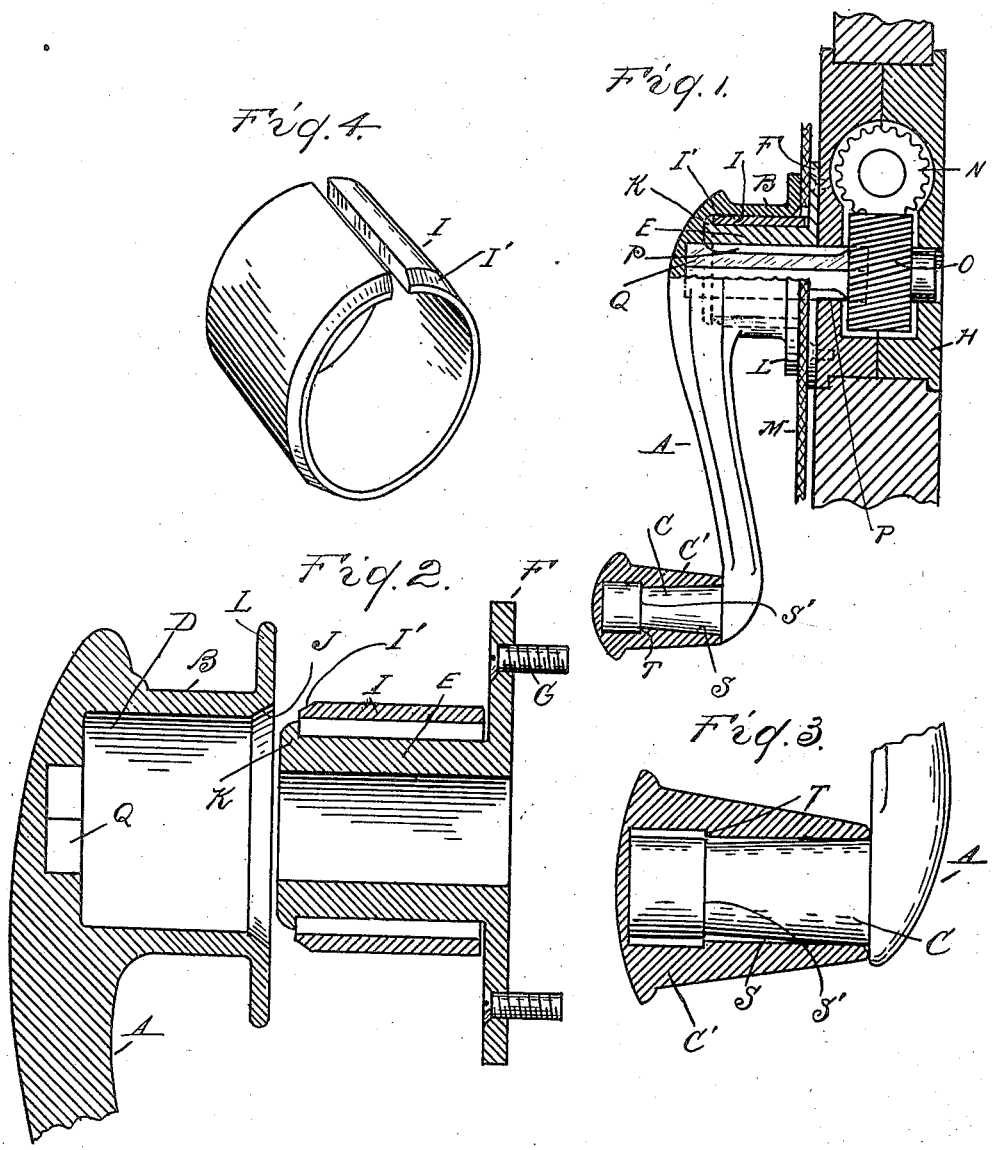

1,603,396

UNITED STATES PATENT OFFICE.

STANLEY W. NICHOLSON, OF TOLEDO, OHIO, ASSIGNOR TO THE DURA COMPANY, OF TOLEDO, OHIO, A CORPORATION OF DELAWARE.

HANDLE AND MOUNTING FOR SAME.

Application filed July 9, 1921. Serial No. 483,641.

This invention relates to handles and mounting for same, and relates more particularly to handles for actuating window control mechanisms.

It is the object of the invention to provide an improved means for quickly journaling the handle upon its mounting and retaining the handle against axial disengagement from the mounting. The invention consists further in an improved assembly of a knob or finger grip upon the handle.

In the drawings:

Figure 1 is a view partially in side elevation and partly in section of the mounted handle, showing a portion of the mechanism actuable by the handle;

Figure 2 is a enlarged sectional view of the journal portion of the handle and its mounting prior to assembly;

Figure 3 is a detail sectional view of the knob or finger grip engaged with the handle prior to locking said knob against removal;

Figure 4 is a perspective view of a split bushing employed in mounting the handle.

In these views, the reference character A designates a crank handle of a type commonly employed for actuating window control mechanisms, one extremity of said handle being formed with a projecting bearing portion B, and the other extremity carrying an oppositely projecting pin C for engagement by a knob or finger grip C'. The bearing B is formed with the central opening D for engagement with a tubular journal pin E, the chamber D being open only toward said journal pin. The latter is formed with an annular flange F which is adapted to be attached by screws G or the like, to any suitable support, as for example, the gear box indicated at H. To rotatively secure the handle A upon the journal pin E, there is employed a split resilient bushing I beveled at one end as indicated at I'. The opening D is correspondingly beveled adjacent its mouth as indicated at J. Thus after the bushing I has been engaged in an embracing relation with the pin E the bearing B may be forced by application of sufficient pressure into embracing relation with the bushing I, the beveled face J riding upon the beveled edge I' and contracting the split bushing as the same enters the opening D. Adjacent its free end the journal pin E is formed with an annular flange K, and the width and thickness of the bushing I are such as to adapt said bushing to fit snugly, when contracted, between the flanges F and K, in a substantially flush relation with the latter. The bushing I while resilient, is sufficiently stiff to require considerable pressure to force the bearing B into embracing relation with said bushing so that the assembly of the bearing and bushing is of a permanent nature. The said bushing, when contracted within the bearing B, retains the handle permanently upon the journal pin since the flange K prevents removal of the bushing. The contraction of the bushing is not sufficient, however, to prohibit free rotation of the handle and its bushing upon the journal pin. It is preferred to form an annular flange or escutcheon plate L upon the inner end of the bearing B between which flange and the flange F is engaged the interior trimming M of the vehicle when the invention is used in connection with the window control mechanism of a motor vehicle.

In Figure 1, gears N and O of such mechanism are shown mounted in the gear box H, the gear O being actuable from the handle by a coupling member P, the outer end of which is driven by engagement in a polygonal socket Q formed in the end wall of the opening D.

As a provision for assembling the knob C' upon the pin C it is preferred to gradually taper said pin as indicated at S from its inner end to an annular shoulder S', and to form the central opening of the knob with an outer portion of slightly increased diameter so that after the knob has been engaged in embracing relation with the pin, as shown in Figure 3, external pressure may be applied to the knob to reduce the diameter of the inner portion of its central opening so as to engage a shoulder T formed at the juncture of said portion with the enlarged outer portion behind the shoulder S', as disclosed in Figure 1, thus securely retaining the knob upon the pin.

The described construction provides a very secure assembly both of the handle upon its mounting, and of the knob upon the handle, and said assembly further is one that may be very quickly established.

What I claim as my invention is:

1. In a device of the character described, the combination with a handle having a tubular bearing portion, of a journal member for said handle mounted at one end to a support and having an outward projection upon its other end, and a split resilient bushing of lesser length than said journal member upon which the handle is pressed, said bushing being engageable bodily behind said projection of the journal member through contraction induced by pressing of the handle thereupon.

2. In a device of the character described, the combination with a handle having a tubular bearing portion, of a journal member therefor supported at one end and formed at its other with an annular shoulder, and a split resilient bushing upon which said handle is pressed of lesser length than said journal member, the bushing being contracted through engagement of the handle therewith, and engageable bodily between said flange and the supported end of the journal member.

3. In a device of the character described, the combination with a handle having a bearing portion, of a journal member engageable by said bearing portion, supported at one end and having a radial outward projection at its other, a split resilient bushing embraced within the bearing portion of the handle and contracted through engagement with the handle to engage between said projection and the supported end of the handle rotatively retaining the handle upon the journal member, the outer end of the bushing and the mouth of the opening of the bearing having beveled faces engageable to facilitate pressing of the bearing into embracing relation with the bushing.

4. In a device of the character described, the combination with a rotative handle and a relatively stationary mounting for said handle, of a split resilient bushing interiorly engaging one of said parts and contracted through engagement therewith, the other part being formed with a shoulder engageable by said bushing to prevent relative axial shifting of said parts, said bushing having an exteriorly bevelled extremity and the member receiving the bushing having a complementary bevelled face facilitating contraction of the bushing by engagement with said bevelled end thereof.

5. The combination with a tubular bearing, of a handle member having an opening to receive said bearing and having a polygonal socket in an end face of said opening, means within said handle member for securing said bearing and handle to each other and a drive member passing through said tubular bearing and having a polygonal portion loosely engaging said polygonal socket.

6. The combination with a tubular bearing having a projection, of a handle member journaled upon said tubular bearing, a split resilient bushing controlled by its engagement within said handle member to retain the latter upon said bearing through engagement of said bushing with said projection of the bearing, and a drive element passing through the bearing and rotatively actuable by said handle member.

In testimony whereof I affix my signature.

STANLEY W. NICHOLSON.